(12) United States Patent
Doyle et al.

(10) Patent No.: US 7,197,719 B2
(45) Date of Patent: Mar. 27, 2007

(54) GRAPHICAL USER INTERFACE FOR DETAIL-IN-CONTEXT PRESENTATIONS

(75) Inventors: Michael Doyle, Vancouver (CA); Richard Rupp, Burnaby (CA); Garth Shoemaker, Coquitlam (CA); Collette Ostler, West Vancouver (CA)

(73) Assignee: Idelix Software Inc., Vancouver (CA)

( * ) Notice: Subject to any disclaimer, the term of this patent is extended or adjusted under 35 U.S.C. 154(b) by 726 days.

(21) Appl. No.: 10/137,648

(22) Filed: May 3, 2002

(65) Prior Publication Data

US 2002/0180801 A1 Dec. 5, 2002

(30) Foreign Application Priority Data

May 3, 2001 (CA) .................... 2345803

(51) Int. Cl.
*G06F 3/00* (2006.01)

(52) U.S. Cl. .............. 715/801; 715/800; 345/660

(58) Field of Classification Search ................ 715/801, 715/781, 800; 345/660, 661
See application file for complete search history.

(56) References Cited

U.S. PATENT DOCUMENTS

| | | | |
|---|---|---|---|
| 4,688,181 A | | 8/1987 | Cottrell et al. |
| 5,583,977 A | | 12/1996 | Seidl |
| 5,588,098 A | | 12/1996 | Chen et al. |
| 5,638,523 A | * | 6/1997 | Mullet et al. ................ 715/855 |
| 5,670,984 A | * | 9/1997 | Robertson et al. .......... 345/585 |
| 5,682,489 A | | 10/1997 | Harrow et al. |
| 5,798,752 A | | 8/1998 | Buxton et al. |
| 5,818,455 A | * | 10/1998 | Stone et al. ................. 345/619 |
| 6,037,939 A | * | 3/2000 | Kashiwagi et al. .......... 715/798 |
| 6,075,531 A | | 6/2000 | Destefano |
| 6,084,598 A | * | 7/2000 | Chekerylla .................. 345/441 |
| 6,128,024 A | | 10/2000 | Carver |
| 6,204,845 B1 | | 3/2001 | Bates et al. |
| 6,249,281 B1 | | 6/2001 | Chen et al. |
| 6,633,305 B1 | * | 10/2003 | Sarfeld ....................... 345/671 |
| 2001/0040585 A1 | | 11/2001 | Hartford et al. |

FOREIGN PATENT DOCUMENTS

| | | |
|---|---|---|
| EP | 0 635 779 | 1/1995 |
| EP | 0 816 983 | 1/1998 |

OTHER PUBLICATIONS

Microsoft Corp., Microsoft Paint, 1981-1998, Microsoft Corp., Paint 1-14.*
Carpendale, Marianne S. T., "A Framework for Elastic Presentation Space", (Burnaby, British Columbia; Simon Fraser University, 1999).
Electronic Magnifying Glasses, IBM Technical Disclosure Bulletin, IBM Corp., New York, US, vol. 37, No. 3, Mar. 1, 1994.

* cited by examiner

*Primary Examiner*—Raymond J. Bayerl
*Assistant Examiner*—Dennis G. Bonshock
(74) *Attorney, Agent, or Firm*—Joseph Conneely; McCarthy Tetrault LLP

(57) ABSTRACT

A method for displaying a region of interest within visual information on a display screen of a computer, the region of interest including a focal region and a base region. The method includes the steps of: providing means for selecting at least one parameter for transforming at least one of the region of interest, the focal region, and the base region; selecting the parameter using the means for selecting; transforming the visual information in accordance with a predetermined distortion function and the parameter to produce transformed visual information; and, displaying the transformed visual information on the display screen.

54 Claims, 5 Drawing Sheets

GRAPHICAL USER INTERFACE FOR DETAIL-IN-CONTEXT PRESENTATIONS

This application claims priority from Canadian Patent Application No. 2,345,803, filed May 3, 2001, and incorporated herein by reference.

The invention relates to the field of computer graphics processing, and more specifically to a graphical user interface (GUI) to a detail-in-context presentation system.

BACKGROUND OF THE INVENTION

Display screens are the primary visual display interface to a computer. One problem with these visual display screens is that they are limited in size, thus presenting a challenge to user interface design, particularly when larger amounts of information is to be displayed. This problem is normally referred to as the "screen real estate problem".

Well-known solutions to this problem include panning, zooming, scrolling or combinations thereof. While these solutions are suitable for a large number of visual display applications, these solutions become less effective where the visual information is spatially related, such as maps, newspapers and such like. In this type of information display, panning, zooming and/or scrolling is not as effective as much of the context of the panned, zoomed or scrolled display is hidden.

A recent solution to this problem is the application of "detail-in-context" presentation techniques. Detail-in-context is the magnification of a particular region of interest (the "focal region") in a data presentation while preserving visibility of the surrounding information. This technique has applicability to the display of large surface area media, such as maps, on limited size computer screens such as personal digital assistance (PDA's) and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as Elastic Presentation Space ("EPS") may be found in a publication by Marianne S. T. Carpendale, entitled "A Framework for Elastic Presentation Space" (Burnaby, British Columbia: Simon Fraser University, 1999), and incorporated herein by reference.

Development of increasingly powerful computing devices has lead to new possibilities for applications of detail-in-context viewing. At the same time, the demand for user control over the parameters of a detail-in-context lens has increased. Indeed, one shortcoming of current EPS graphics technology and detail-in-context presentation methods is the lack of an effective user friendly graphical user interface ("GUI") for the control of lens display parameters. Generally, with a GUI, a user interacts with icons and controls in a GUI display by moving a pointing device, such as a mouse, which causes a censor or pointer to be moved on the display. When the pointer is over the displayed icon or control, the user presses a button, such as a mouse button, to invoke one or more operations to be performed by the computer system.

A need therefore exists for a GUI to control one or more features of a detail-in-context display system. Consequently, it is an object of the present invention to obviate or mitigate at least some of the above-mentioned disadvantages.

SUMMARY OF THE INVENTION

According to one aspect of the invention, a method is provided for displaying a region of interest within visual information on a display screen of a computer, the region of interest including a focal region and a base region. The method includes the steps of: providing means for selecting at least one parameter for transforming at least one of the region of interest, the focal region, and the base region; selecting the parameter using the means for selecting; transforming the visual information in accordance with a predetermined distortion function and the parameter to produce transformed visual information; and, displaying the transformed visual information on the display screen.

According to another aspect of the invention, the parameter includes a magnification for the region of interest, a size for the focal region, a size for the base region, a shape for the focal region, a shape for the base region, a location for the base region within the visual information, and a location for the focal region relative to the base region.

According to another aspect of the invention, the means for selecting includes bounding rectangle, handle, crosshairs, and slide bar.

Advantageously, the method of the invention is implemented using user friendly graphical user interface.

BRIEF DESCRIPTION OF THE DRAWINGS the invention may best be understood by referring to the following description and accompanying drawings which illustrate the invention. In the drawings.

Figure 4:
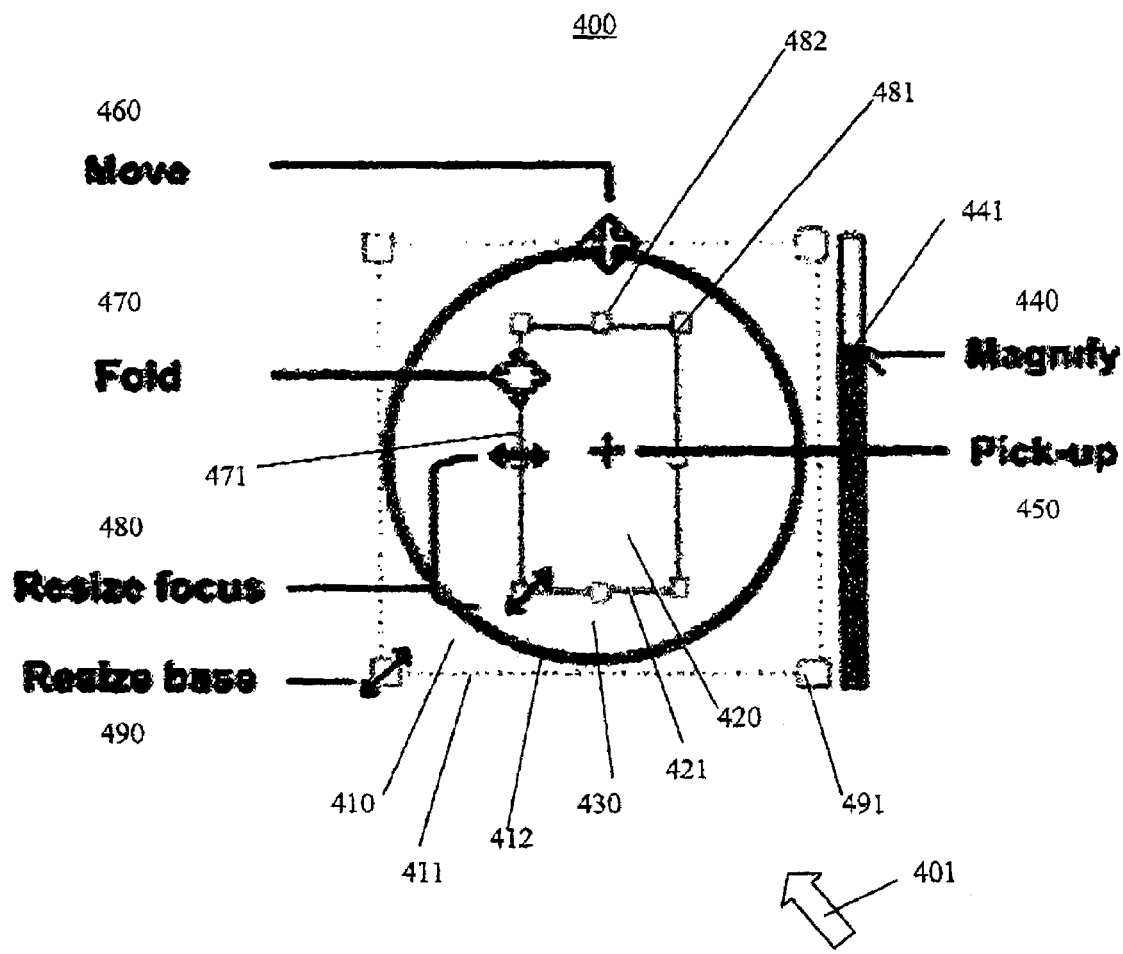
Figure 5:
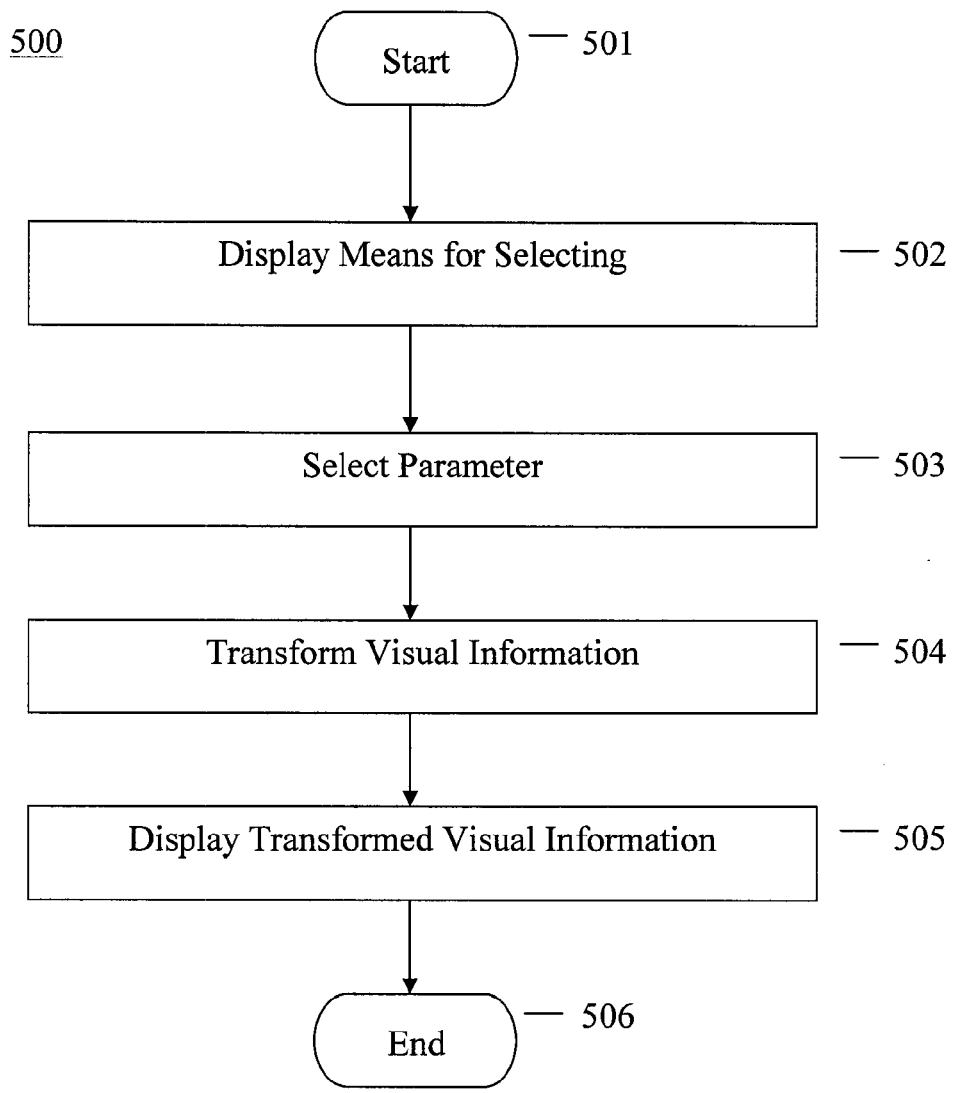

FIG. 4 a partial screen capture illustrating a GUI having lens control elements for user interaction with detail-in-context data presentations in accordance with an embodiment of the invention; and, FIG. 5 is a flow chart illustrating a general method for displaying a region of interest within visual information on a display screen of a computer in accordance with an embodiment of the invention.

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein. The term "Elastic Presentation Space" or "EPS" is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in *A Framework for Elastic Presentation Space* (Carpendale, Marianne S. T., *A Framework for Elastic Presentation Space* (Burnaby, British Columbia; Simon Fraser University, 1999)) which is incorporated herein by reference. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection. In the drawings, like numerals refer to like structures or processes.

Figure 1:
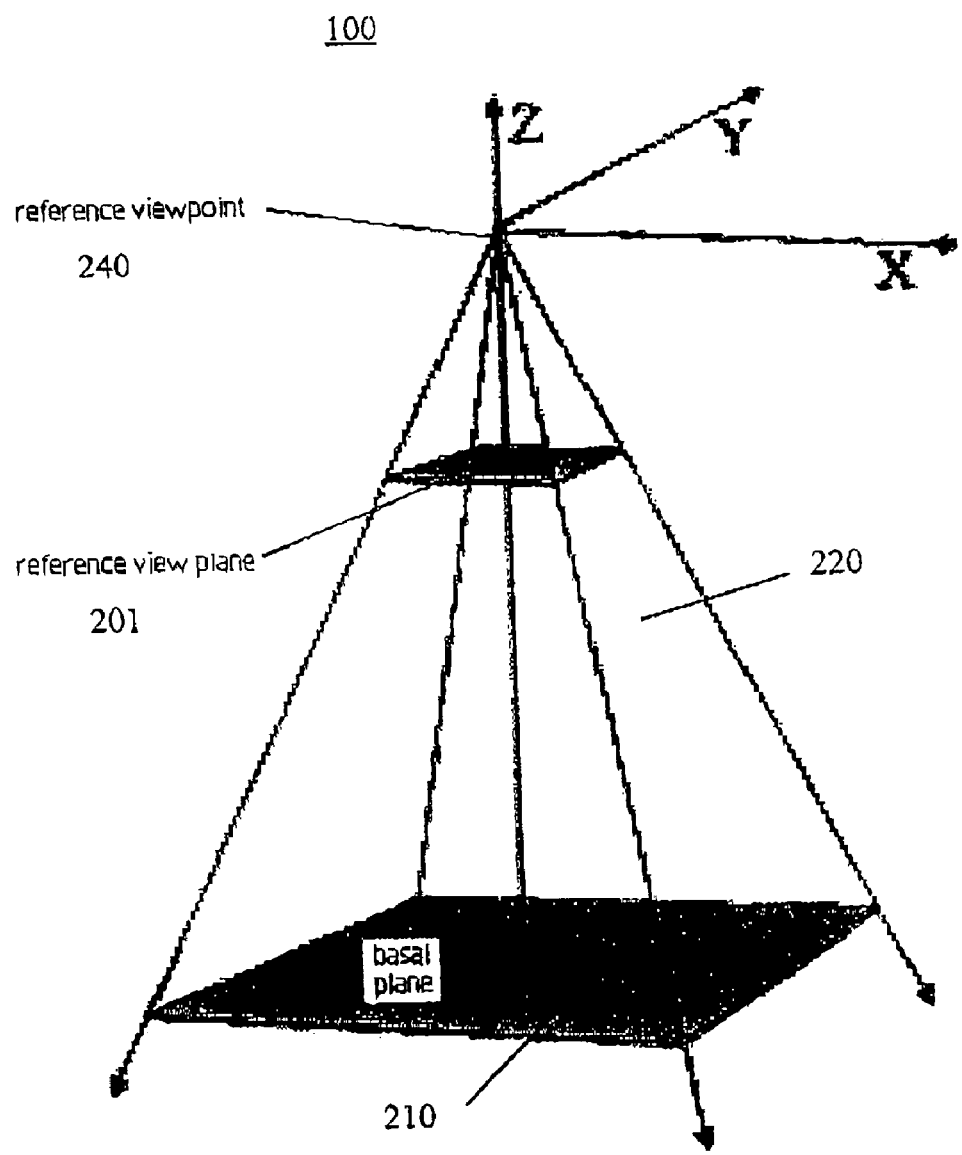
FIG. 1 is a graphical construction illustrating a 3D perspective viewing frustum in accordance with known elastic presentation space graphics technology.

Referring to FIG. 1, there is shown a graphical representation 100 of the geometry for constructing a three-dimensional (3D) perspective viewing frustum 220 relative to an x, y, z coordinate system in accordance with known elastic presentation space ("EPS") graphics technology. In the EPS, detail-in-context views of 2D visual representations are created with sight-line aligned distortions of a two-dimensional (2D) information presentation surface within a 3D perspective viewing frustum 220. In UPS, magnification of regions of interest and the accompanying compression of the contextual region to accommodate this change in scale are produced by the movement of regions of the surface towards the viewpoint 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
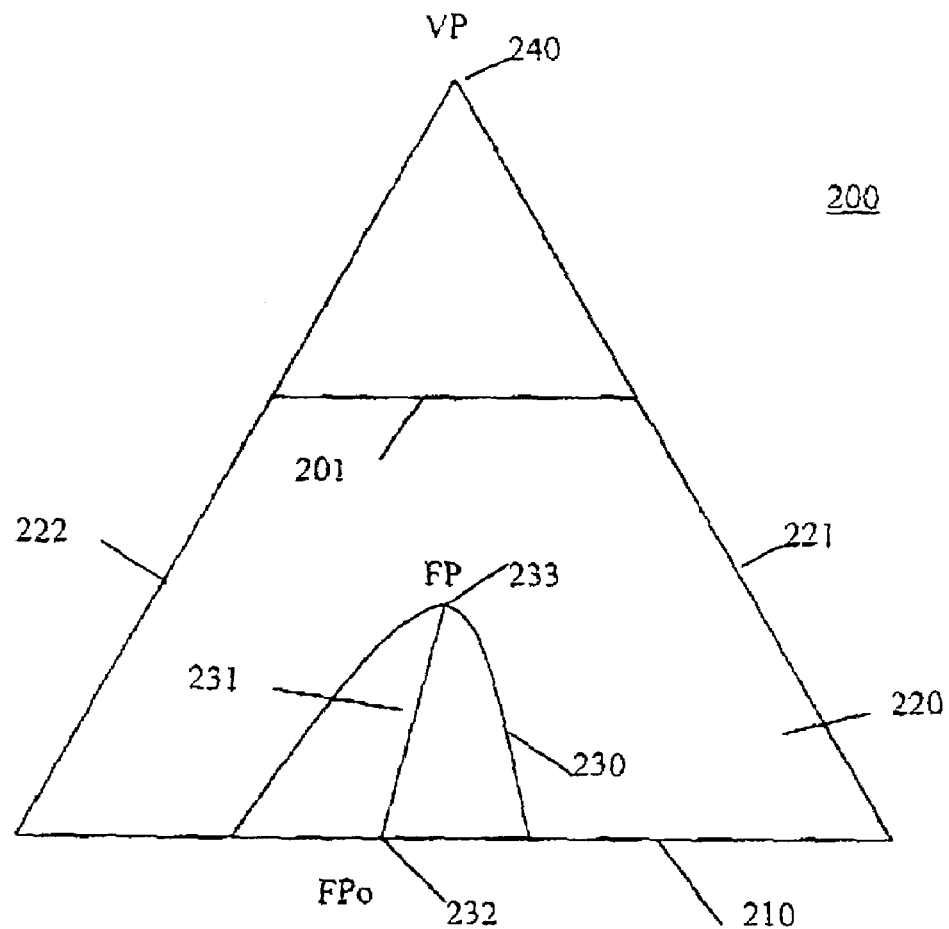
FIG. 2 is a cross-sectional view illustrating a presentation in accordance with known elastic presentation space graphics technology.

Referring to FIG. 2, there is shown geometrical representation of a presentation 200 in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. A viewpoint ("VP") 240 is located above the centre point of the basal plane 210 and reference view plane 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

To reiterate, EPS refers to a collection of know-how and techniques for performing "detail-in-context viewing" (also known as "multi-scale viewing" and "distortion viewing") of information such as images, maps, and text, using a projection technique summarized below. EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired, in combination with compression of a restricted range of areas of the remaining information (the "context"), the end result typically giving the appearance of a lens having been applied to the display surface. EPS has numerous advantages over conventional zoom, pan, and scroll technologies, including the capability of preserving the visibility of information outside the local region of interest.

In general, in EPS, the source image to be viewed is located in the basal plane. Magnification and compression are achieved through elevating elements of the source image relative to the basal plane, and then projecting the resultant distorted surface onto the reference view plane. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation.

For example, and referring to FIGS. 1 and 2, in two dimensions, EPS can be implemented through the projection of an image onto a reference plane 201 in the following manner. The source image is located on a basal plane 210, and those regions of interest 233 of the image for which magnification is desired are elevated so as to move them closer to a reference plane situated between the reference viewpoint 240 and the reference view plane (RVP) 201. Magnification of the "focal region" 233 closest to the RVP varies inversely with distance from the RVP 201. As shown in FIGS. 1 and 2, compression of regions outside the focal region 233 is a function of both distance from the RVP 201, and the gradient of the function describing the vertical distance from the RVP 201 with respect to horizontal distance from the focal region 233. The resultant combination of magnification and compression of the image as seen from the reference viewpoint 240 results in a lens-like effect similar to that of a magnifying glass applied to the image, and the resultant distorted image may be referred to as a "pliable display surface". Hence, the various functions used to vary the magnification and compression of the image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
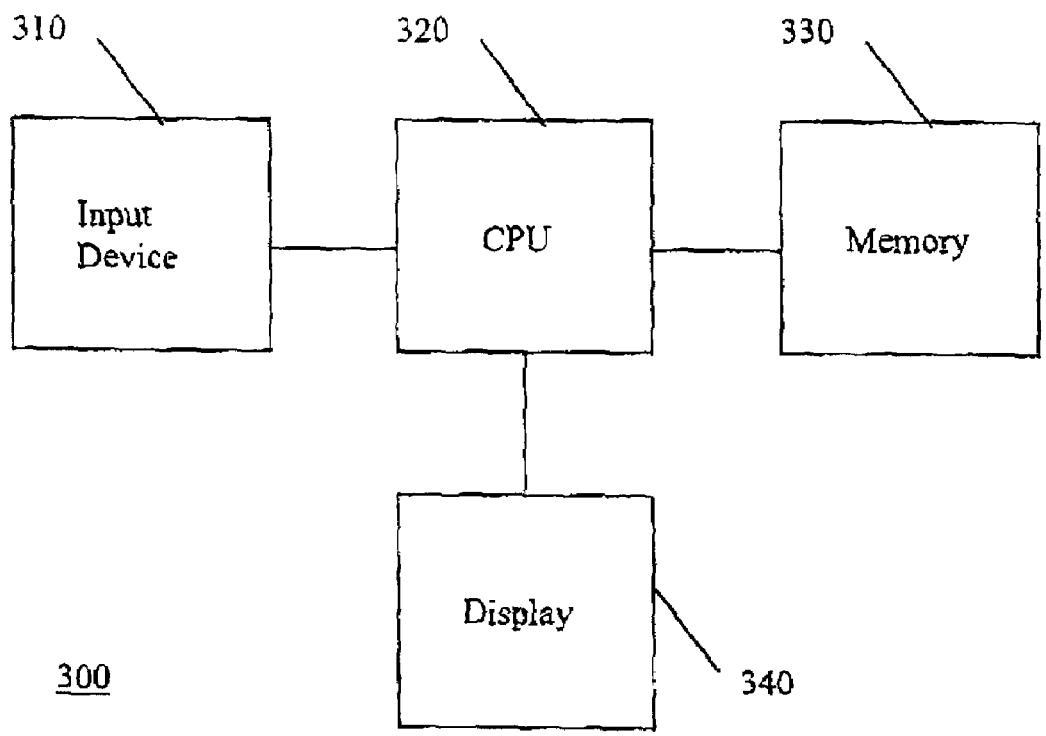
FIG. 3 is a block diagram illustrating an exemplary data processing system for implementing an embodiment of the invention.

System. Referring to FIG. 3, there is shown a block diagram of an exemplary data processing system 300 for implementing an embodiment of the invention. The data processing system is suitable for implementing EPS technology in conjunction with a graphical user interface ("GUI"). The data processing system 300 includes an input device 310, a central processing unit or CPU 320, memory 330, and a display 340. The input device 310 may be a keyboard, mouse, trackball, or similar device. The CPU 320 may include dedicated coprocessors and memory devices. The memory 330 may include RAM, ROM, databases, or disk devices. And, the display 340 may include a computer screen or terminal device. The data processing system 300 has stored therein data representing sequences of instructions which when executed cause the method described herein to be performed. Of course, the data processing system 300 may contain additional software and hardware a description of which is not necessary for understanding the invention.

GUI with Lens Control Elements. As mentioned, detail-in-context presentations of data using techniques such as pliable surfaces, as described by Carpendale, are useful in presenting large amounts of information on limited-size display surfaces. Detail-in-context views allow magnification of a particular region of interest (the "focal region") 233 in a data presentation while preserving visibility of the surrounding information 210. In the following, a GUI having lens control elements that can be implemented in software and applied to the control of detail-in-context data presentations, including EPS and pliable surfaces, is described. The software can be loaded into and run by the exemplary data processing system 300 of FIG. 3.

Referring to FIG. 4, there is a partial screen capture illustrating a GUI 400 having lens control elements for user interaction with detail-in-context data presentations in accordance with an embodiment of the invention. Detail-in-context data presentations are characterized by magnification of areas of an image where detail is desired, in combination with compression of a restricted range of areas of the remaining information (i.e. the "context"), the end result typically giving the appearance of a "lens" having been applied to the display screen surface. This "lens" 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. Referring again to FIG. 2, the lens 410 corresponds to the projection of the distorted surface 230 and focal region 233 onto the reference plane 201.

In general, the GUI 400 has lens control elements that, in combination, provide for the interactive control of the lens 410. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of a pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 on the display surface 340 (e.g. cursor) to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2-D or 3-D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, and magnify. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, and magnify slide bar icon 440. Typically, these icons are displayed simultaneously after selection of the lens 410. In addition, when the cursor 401 is located within the extent of a selected lens 410, an alternate cursor icon 460, 470, 480, 490 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Move. Lateral movement of a lens 410 is provided by the move lens control element of the GUI. This functionality is accomplished by the user first selecting the lens 410 through a point and click operation. Then, the user points to a point within the lens 410 that is other than a point lying on a lens control icon 450, 412, 411, 421, 481, 482, 491, 440. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Pickup. Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resize Base. Resizing of the base 412 (or outline) of a lens 410 is provided by the resize base lens control element of the GUI. After the lens 410 is selected, a bounding rectangle icon 411 is displayed surrounding the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles (not shown) will change the proportions of the base 412. That is, the middle handles (not shown) change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle (not shown) may include arrows indicating width resizing or height resizing. After pointing at the desired handle 491, the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed Resize Focus. Resizing of the focal region 420 of a lens 410 is provided by the resize focus lens control element of the GUI. After the lens 410 is selected, a bounding rectangle icon 421 is displayed surrounding the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Fold. Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231.

In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and night motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnify. Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed.

Typically, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Icon Hiding. Advantageously, a user may choose to hide one or more lens control icons 450, 412, 411, 421, 481, 482, 491, 440 shown in FIG. 4 from view so as not to impede the user's view of the data (i.e. visual information) within the lens 410. This may be helpful, for example, during a move operation. A user may select this option through means such as a menu or lens property dialog box.

Method. Referring to FIG. 5, there is shown a flow chart 500 illustrating a general method for displaying a region of interest within visual information on a display screen of a computer, the region of interest having a focal region and a base region, in accordance with an embodiment of the invention. At step 501, the method starts. At step 502, means are provided for choosing at least one parameter for transforming at least one of the region of interest, the focal region, and the base region. At step 503, the parameter is selected using the selecting means. At step 504, the visual information is transformed in accordance with a predetermined distortion function and the parameter to produce transformed visual information. At step 505, the transformed visual information is displayed on the display screen. At step 506, the method ends. The selected parameter may include a magnification for the region of interest 410, a size for the focal region 420, a size for the base region 410, a shape for the focal region 420, a shape for the base region 410, a location for the base region within the visual information 450, 460, and a location for the focal region relative to the base region 470. The means for selecting includes slide bars 440 and handles 481, 482, 491, 471, 441.

Data Carrier Product. The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product. The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method in a computer system for adjusting a presentation of a region of interest within visual information displayed on a display screen, comprising the steps of:

a) receiving a signal for selecting said region of interest from a user, said user using a mouse to position a cursor over said region of interest and pressing a button on said mouse;
b) displaying a representation of a bounding rectangle over said region of interest when said region of interest is selected, said bounding rectangle having one or more active areas for respective transformation types;
c) receiving a signal to initiate a transformation type from said user, said user using said mouse to position said cursor over an active area, pressing said button on said mouse, and, while said cursor is over said active area, repositioning said cursor with said mouse; and,
d) transforming said visual information with a distortion function for said region of interest shaped by said signal to initiate said transformation type to produce transformed visual information, and displaying said transformed visual information on said display screen;

wherein said region of interest has associated therewith a focal region at least partially surrounded by a base region, said distortion function having a magnification being uniform for said focal region and varying for said base region such that said distortion function is continuous from regions outside said region of interest through said base region to said focal region;

wherein said transformation type includes at least one of a resizing and a folding; and, wherein one of said active areas is a fold area positioned over said bounding rectangle between said corner-handle and said middle-handle icons for adjusting a location for said focal region relative to said base region for defining a degree and a direction of said folding for said distortion function.

2. The method of claim 1 wherein one of said active areas is a corner-handle icon positioned over a corner of said bounding rectangle for adjusting a size of said bounding rectangle.

3. The method of claim 2 wherein said cursor changes said shape to a resize icon when positioned over said corner-handle icon or said middle-handle icon.

4. The method of claim 2 wherein said resizing is performed by determining a ratio of a position of said cursor versus an origin of said bounding rectangle when said cursor is positioned over one of said handles and said button is pressed by said user and a current position of said cursor versus and said origin of said bounding rectangle and multiplying said ratio with a resizing transform to create a new resizing transform for shaping said distortion function.

5. The method of claim 1 wherein one of said active areas is a middle-handle icon positioned over said bounding rectangle between corners of said bounding rectangle for adjusting an aspect ratio of said bounding rectangle.

6. The method of claim 1 wherein said cursor changes shape when positioned over one of said active areas.

7. The method of claim 1 wherein said cursor changes said shape to a fold icon when positioned over said fold area.

8. The method of claim 1 wherein said bounding rectangle surrounds said focal region.

9. The method of claim 1 wherein said bounding rectangle surrounds said base region.

10. The method of claim 1 wherein said bounding rectangle includes a first bounding rectangle surrounding said focal region and a second bounding rectangle surrounding said base region.

11. The method of claim 1 wherein said bounding rectangle includes a first bounding rectangle surrounding said focal region and a second bounding rectangle surrounding said base region and wherein said fold area is positioned over said first bounding rectangle surrounding said focal region.

12. The method of claim 1 wherein said folding is performed by determining a difference between a position of said cursor when said cursor is positioned over said fold area and said button is pressed by said user and a current position of said cursor, and adding said difference to a folding transform to create a new folding transform for shaping said distortion function.

13. The method of claim 1 wherein said transforming further comprises displacing said visual information onto said distortion function and perspectively projecting said displacing onto a plane in a direction aligned with a viewpoint for said region of interest.

14. A method in a computer system for adjusting a presentation of a region of interest within visual information displayed on a display screen, comprising the steps of:
a) receiving a signal for selecting said region of interest from a user, said user using a mouse to position a cursor over said region of interest and pressing a button on said mouse;
b) displaying a graphical user interface over said region of interest when said region of interest is selected, said graphical user interface having one or more active areas for respective transformation types;
c) receiving a signal to initiate a transformation type from said user, said user using said mouse to position said cursor over an active area, pressing said button on said mouse, and, while said cursor is over said active area, repositioning said cursor with said mouse; and
d) transforming said visual information with a distortion function for said region of interest shaped by said signal to initiate said transformation type to produce transformed visual information, and displaying said transformed visual information on said display screen;

wherein said region of interest has associated therewith a focal region at least partially surrounded by a base region, said distortion function having a magnification being uniform for said focal region and varying for said base region such that said distortion function is continuous from regions outside said region of interest through said base region to said focal region;

wherein said graphical user interface includes: a representation of a first bounding rectangle surrounding said focal region, said first bounding rectangle having one or more of said active areas; a representation of a second bounding rectangle surrounding said base region, said second bounding rectangle having one or more of said active areas; a representation of a base outline, said base outline positioned within said second bounding rectangle, said base outline outlining said base region; a representation of a pickup icon, said pickup icon positioned centrally in said region of interest, said pickup icon having at least one active area for a respective transformation type; a representation of a slide bar icon, said slide bar icon positioned adjacent to said second bounding rectangle and outside of said region of interest, said slide bar icon having at least one active area for a respective transformation type; and, a move area within said region of interest, said move area having at least one active area for a respective transformation type, said move area located within said region of interest, said move area excluding said first bounding rectangle, said second bounding rectangle, and said pickup icon;

wherein said transformation type includes at least one of a focal region resizing, a base region resizing, a folding, a translation, and said magnification;

wherein one of said active areas is a corner-handle icon positioned over a corner of said first bounding rectangle for adjusting a size of said first bounding rectangle;

wherein one of said active areas is a middle-handle icon positioned over said first bounding rectangle between corners of said first bounding rectangle for adjusting an aspect ratio of said first bounding rectangle;

wherein one of said active areas is a corner-handle icon positioned over a corner of said second bounding rectangle for adjusting a size of said second bounding rectangle;

wherein one of said active areas is a middle-handle icon positioned over said second bounding rectangle between corners of said second bounding rectangle for adjusting an aspect ratio of said second bounding rectangle; and, wherein one of said active areas is a fold area positioned over said first bounding rectangle between said corner-handle and said middle-handle icons for adjusting a location for said focal region relative to said base region for defining a degree and a direction of said folding for said distortion function.

15. The method of claim 14 wherein one of said active areas is said pickup icon for adjusting a location for said region of interest within said visual information.

16. The method of claim 15 wherein one of said active areas is a bar icon positioned over said slide bar icon for adjusting said magnification.

17. The method of claim 16 wherein said cursor changes shape when positioned over one of said active areas.

18. The method of claim 17 wherein said cursor changes said shape to a resize icon when positioned over said corner-handle icon or said middle-handle icon.

19. The method of claim 17 wherein said cursor changes said shape to a fold icon when positioned over said fold area.

20. The method of claim 17 wherein said cursor changes said shape to a move icon when positioned over said move area.

21. The method of claim 14 wherein said pickup icon is crosshairs shaped.

22. The method of claim 14 wherein said focal region resizing is performed by determining a ratio of a position of said cursor versus an origin of said first bounding rectangle when said cursor is positioned over one of said handles and said button is pressed by said user and a current position of said cursor versus said origin of said first bounding rectangle and multiplying said ratio with a focal region resizing transform to create a new focal region resizing transform for shaping said distortion function.

23. The method of claim 14 wherein said base region resizing is performed by determining a ratio of a position of said cursor versus an origin of said second bounding rectangle when said cursor is positioned over one of said handles and said mouse button is pressed by said user and a current position of said cursor versus said origin of said second bounding rectangle and multiplying said ratio with a base resizing transform to create a new base resizing transform for shaping said distortion function.

24. The method of claim 14 said folding is performed by determining a difference between a position of said cursor when said cursor is positioned over said fold area and said mouse button is pressed by said user and a current position of said cursor, and adding said difference to a folding transform to create a new folding transform for shaping said distortion function.

25. The method of claim 14 said translation is performed by determining a difference between a position of said cursor when said cursor is positioned over said move area and said mouse button is pressed by a user and a current position of said cursor, and adding said difference to a translation transform to create a new translation transform for positioning said distortion function.

26. The method of claim 14 wherein said magnification is performed by determining a ratio of a position of said cursor versus an origin of said slide bar icon when said cursor is positioned over said bar icon and said mouse button is pressed by a user and a current position of said cursor versus said origin of said slide bar icon and multiplying said ratio with a magnification transform to create a new magnification transform for shaping said distortion function.

27. The method of claim 14 wherein said transforming further comprises displacing said visual information onto said distortion function and perspectively projecting said displacing onto a plane in a direction aligned with a viewpoint for said region of interest.

28. A graphical user interface ("GUI") for adjusting a presentation of a region of interest within visual information displayed on a display screen of a computer, said region of interest having associated therewith a focal region at least partially surrounded by a base region, said GUI comprising:
  a) a representation of a first bounding rectangle surrounding said focal region, said first bounding rectangle having one or more active areas, said first bounding rectangle for resizing said focal region;
  b) a representation of a second bounding rectangle surrounding said base region, said second bounding rectangle having one or more active areas, said second bounding rectangle for resizing said base region;
  c) a representation of a base outline, said base outline positioned within said second bounding rectangle, said base outline outlining said base region;
  d) a representation of a pickup icon, said pickup icon positioned centrally in said region of interest, said pickup icon having at least one active area for a respective transformation type, said pickup icon for moving said region of interest;
  e) a representation of a slide bar icon, said slide bar icon positioned adjacent to said second bounding rectangle and outside of said region of interest, said slide bar icon having at least one active area for a respective transformation type, said slide bar icon for adjusting a magnification for said region of interest; and,
  f) a move area within said region of interest, said move area having at least one active area for a respective transformation type, said move area located within said region of interest, said move area excluding said first bounding rectangle, said second bounding rectangle, and said pickup icon, said move area for moving said region of interest;

wherein each of said active areas is for selecting at least one parameter for adjusting at least one of said region of interest, said focal region, and said base region by transforming said visual information with a distortion function shaped by said parameter to produce transformed visual information for display on said display screen;

wherein said distortion function has a magnification being uniform for said focal region and varying for said base region such that said distortion function is continuous from regions outside said region of interest through said base region to said focal region;

wherein one of said active areas is a corner-handle icon positioned over a corner of said first bounding rectangle for adjusting a size of said first bounding rectangle;

wherein one of said active areas is a middle-handle icon positioned over said first bounding rectangle between corners of said first bounding rectangle for adjusting an aspect ratio of said first bounding rectangle;

wherein one of said active areas is a corner-handle icon positioned over a corner of said second bounding rectangle for adjusting a size of said second bounding rectangle;

wherein one of said active areas is a middle-handle icon positioned over said second bounding rectangle between corners of said second bounding rectangle for adjusting an aspect ratio of said second bounding rectangle; and, wherein one of said active areas is a fold area positioned over said first bounding rectangle between said corner-handle and said middle-handle icons for adjusting a location for said focal region relative to said base region for defining a degree and a direction of said folding for said distortion function.

29. The GUI of claim 28 wherein one of said active areas is said pickup icon for adjusting a location for said region of interest within said visual information.

30. The GUI of claim 29 wherein one of said active areas is a bar icon positioned over said slide bar icon for adjusting said magnification.

31. The GUI of claim 30 wherein said cursor changes shape when positioned over one of said active areas.

32. The GUI of claim 31 wherein said cursor changes said shape to a resize icon when positioned over said corner-handle icon or said middle-handle icon.

33. The GUI of claim 31 wherein said cursor changes said shape to a fold icon when positioned over said fold area.

34. The GUI of claim 31 wherein said cursor changes said shape to a move icon when positioned over said move area.

35. The GUI of claim 28 wherein said pickup icon is crosshairs shaped.

36. The GUI of claim 28 wherein said computer is a personal digital assistant (PDA).

37. The GUI of claim 28 wherein said computer is a map display system.

38. The method of claim 28 wherein said transforming further comprises displacing said visual information onto said distortion function and perspectively projecting said displacing onto a plane in a direction aligned with a viewpoint for said region of interest.

39. A method for displaying a region of interest within visual information on a display screen of a computer, said region of interest having associated therewith a focal region at least partially surrounded by a base region, said method comprising the steps of:

providing means for selecting at least one parameter for adjusting said focal region and said base region;

receiving said parameter through said means;

transforming said visual information with a distortion function shaped by said parameter to produce transformed visual information, said distortion function having a magnification being uniform for said focal region and varying for said base region such that said distortion function is continuous from regions outside said region of interest through said base region to said focal region; and, displaying said transformed visual information on said display screen;

wherein said parameter is a location for said focal region relative to said base region for defining a degree and a direction of a folding for said distortion function.

40. The method of claim 39 wherein said parameter includes said magnification.

41. The method of claim 40 wherein said means for selecting includes a slide bar icon for adjusting said magnification.

42. The method of claim 39 wherein said transforming further comprises displacing said visual information onto said distortion function and perspectively projecting said displacing onto a plane in a direction aligned with a viewpoint for said region of interest.

43. The method of claim 39 wherein said parameter includes a size for said focal region.

44. The method of claim 43 wherein said means for selecting includes a handle icon on a bounding rectangle icon for adjusting said size for said focal region within said base region.

45. The method of claim 39 wherein said parameter includes a size for said base region.

46. The method of claim 45 wherein said means for selecting includes a handle icon on a bounding rectangle icon for adjusting said size for said base region.

47. The method of claim 39 wherein said parameter includes a shape for said focal region.

48. The method of claim 47 wherein said means for selecting includes a handle icon on a bounding rectangle icon for adjusting said shape for said focal region.

49. The method of claim 39 wherein said parameter includes a shape for said base region.

50. The method of claim 49 wherein said means for selecting includes a handle icon on a bounding rectangle icon for adjusting said shape for said base region.

51. The method of claim 39 wherein said parameter includes a location for said focal and base regions within said visual information.

52. The method of claim 51 wherein said means for selecting includes a crosshairs icon for adjusting said location for said focal and base regions within said visual information.

53. The method of claim 51 wherein said means for selecting includes at least one active area within at least one of said focal and base regions for adjusting said location for said focal and base regions within said visual information.

54. The method of claim 39 wherein said means for selecting includes a bounding rectangle icon with an active area for adjusting said location for said focal region relative to said base region.

* * * * *

UNITED STATES PATENT AND TRADEMARK OFFICE
CERTIFICATE OF CORRECTION

| | | |
|---|---|---|
| PATENT NO. | : 7,197,719 B2 | |
| APPLICATION NO. | : 10/137648 | |
| DATED | : March 27, 2007 | |
| INVENTOR(S) | : Michael Doyle et al. | |

It is certified that error appears in the above-identified patent and that said Letters Patent is hereby corrected as shown below:

Column 2, line 46: Replace the first occurrence of the word "the" with the word --The--.

Column 9, line 29: Replace the word "night" with the word --right--.

Column 11, line 37: Delete the second occurrence of the word "said".

Column 11, line 45: Delete the first occurrence of the word "and".

Column 11, line 54: Delete the second occurrence of the word "said".

Column 13, line 44: Delete the word "and".

Column 13, line 57: Insert the word --wherein-- before the word "said".

Column 13, line 64: Insert the word --wherein-- before the word "said".

Signed and Sealed this

Twenty-second Day of May, 2007

JON W. DUDAS
*Director of the United States Patent and Trademark Office*